April 30, 1935.    A. E. LARSEN    1,999,840

AIRCRAFT HAVING ROTATIVE SUSTAINING BLADES OR WINGS

Filed June 27, 1931

INVENTOR
Agnew E. Larsen
BY
Synnestvedt & Lechner
ATTORNEYS

Patented Apr. 30, 1935

1,999,840

UNITED STATES PATENT OFFICE 1,999,840

AIRCRAFT HAVING ROTATIVE SUSTAINING BLADES OR WINGS

Agnew E. Larsen, Huntingdon Valley, Pa., assignor to Autogiro Company of America, Philadelphia, Pa., a corporation of Delaware Application June 27, 1931, Serial No. 547,295

8 Claims. (Cl. 244—19)

This invention relates to aircraft having rotative sustaining blades or wings, and more especially to the sustaining rotor construction itself, particularly the rotative hub and blade mounting elements thereof.

One of the primary objects of the invention is to minimize bending forces on or distortion of the hub structure of aircraft sustaining rotors, and to protect the bearings thereof.

Another object of the invention involves the coordination of the hub structure itself and of the blade mounting parts such as the blade pivot pins and the lugs which carry them, in such manner that with a minimum amount of metal, and a minimum overall size, of hub and blade mounting mechanism, for a given size and weight of rotor construction, the stresses, in flight, on diametrically opposite blades of the sustaining unit or rotor may be carried substantially entirely in tension, directly across from one to the other, in a plane which extends generally through the peripheral wall of the hub.

Other objects of the invention are to simplify the hub and the articulative blade mountings, to widen the base of the articulative mounting for a hub of given diameter, and to combine the foregoing with a simple and effective bearing means for the articulations which readily admits of a relatively tight fit of the articulating pin in the blade mounting part or parts and of concentrating moving bearing surfaces, for opposite blades, at points which are in substantially direct line with each other through a substantially continuous hub wall adapted to take tension forces.

How I attain the foregoing, together with other objects and advantages which may be incident to the invention, will be clear from the following description, taken with the accompanying drawing, in which drawing—

Figure 1:
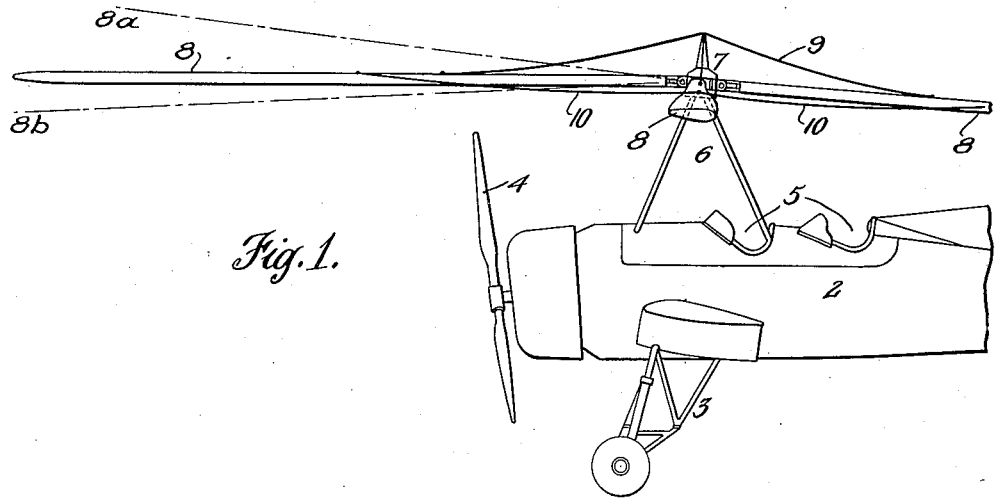
Figure 2:
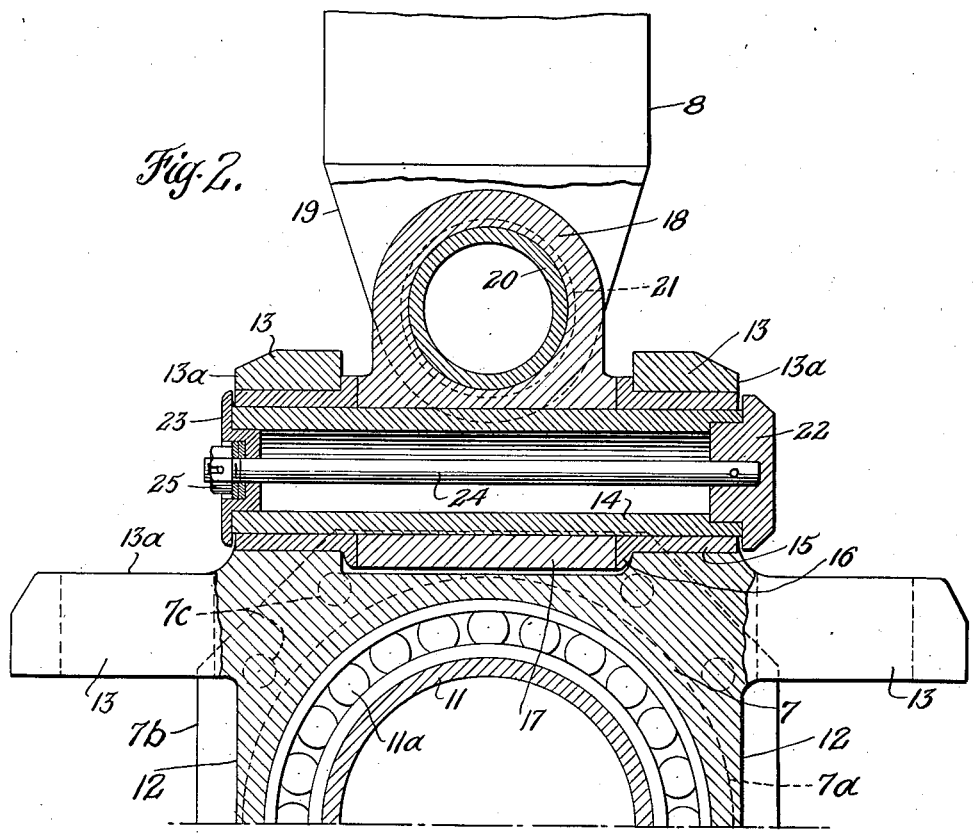

Figure 1 is a fragmentary, somewhat diagrammatic, side elevational view of an aircraft of the pivoted and rotatably mounted sustaining blade type, embodying the present invention; and Figure 2 is an enlarged half-plan view of the rotor head structure of Figure 1, with parts of the hub, bearings and blade articulation in section.

The craft, in general, comprises a body or fuselage 2, with landing gear 3, forward propeller 4, cockpits 5, pylon or rotor mount 6, and sustaining unit or rotor comprising a rotor head or hub indicated generally at 7 and a plurality of sustaining blades or wings 8 articulated thereto after the manner of the disclosure of Figure 2. The hub is mounted for normal rotation under the influence of relative airflow on the wings 8, in any style of flight from full forward movement under the action of the propeller 4 to full vertical descent with or without power, and the articulations of the blades permit them to swing upwardly and downwardly as indicated at 8a and 8b, as well as forwardly and rearwardly in their general path of travel. In accordance with the practice now known, supporting cables 9 are provided to prevent the blades from swinging too low when coming to rest, and flexible interblade connections 10 are provided to prevent excessive displacement of the blades relative to each other, especially when at rest or in starting up.

In Figure 2, I have shown my improved articulative mounting of the blades, in detail. The hub structure 7 is mounted for rotation on the internal fixed spindle 11 as by means of suitable bearings 11a, mounted in races as shown. The said hub is of generally tubular form, rounded upon the inside to fit the bearing structure and substantially squared as at 12, 12 upon the outside, in the vicinity of the blade mounting lugs 13.

I space the pair of lugs 13 for each blade 8, rather widely apart, and substantially in line with or tangent to the wall of the hub 7, and preferably form the outer face 13a of each lug in line with an outer face 12 of the hub.

The lugs are apertured to receive the tubular horizontal pivot member 14, bearing bushings 15 with retaining flanges 16 being fitted between the inside of the lugs and the outside of the pivot pin 14. The pin 14 is in turn pressed into the joint member or articulating sleeve 17, which latter, for any movement or thrust endwise of the pin 14, bears against the bearing flanges 16.

At the outer side of the assembly thus formed, the joint member 17 carries an apertured lug 18 which lies between two apertured ears 19 of the rotor blade member 8, the two ears 19 (only one of which is here shown) having bearings mounting them on the vertical pivot pin 20, which, in turn, is pressed into the apertured lug or ear 18. The bearing for the ear 19 on the pivot 20 is indicated at 21.

It will thus be seen that the joint or block member 17 is preferably non-rotative both with respect to the pivot 14 and with respect to the pivot 20, which gives a good firm grip of the joint member on both the pivot members, intermediate the ends of the latter; and that the movable bearing parts, for each pivot pin, are spaced apart from each other and provide a good base for relative movement and to withstand wear. While I have shown a retaining and securing means for the horizontal articulation only, it will be understood that a similar means may be employed in the vertical articulation; such means preferably comprising a pair of caps or plate members 22, 23, retained in the ends of the pivot pin as by means of a bolt 24 and a removable nut 25.

The arrangement of the hub member, with a number of flat faces, set parallel, in line, or at right angles to one another at various points (all as shown) results in a structure which is much more readily and inexpensively machined than hub structures heretofore employed. Above and below the zone of the mounting lugs the hub may be turned down, as indicated in dotted line at 7a, with base and top flanges shaped somewhat as indicated at 7b, having apertures 7c for securing bolts. The base flange, as in prior practice, is used to mount a brake drum (not shown), and the upper flange is used to mount the cone or tip of the hub.

The entire hub, as so formed, can be readily turned and milled from a single block of metal of outside dimensions of approximately the span of the opposed attachment lugs.

From the foregoing it will be evident that the relative arrangement of the tubular portion of the hub, the fixed spindle, the bearings, the mounting lugs, the blade joint or mounting element, the blade spar ears, the horizontal and vertical pivots, and the bearing bushings therefor, is such that straight-line thrusts are obtained between the opposed wing mountings, preferably through the peripheral walls of the hub, with little or no tendency to distort the hub or bind the bearings; and that a good firm base for the articulating pin bearings is provided, without making the rotor head as a whole too heavy or cumbersome; and that, in general, a simple and rugged structure is provided, within small limits as to size and weight, and of greater ease of manufacture than hubs heretofore employed.

What I claim is:—

1. In an aircraft of the rotating wing type, a sustaining rotor including a rotative hub or axis structure, a plurality of sustaining wings or blades mounted thereon for rotation therewith and for swinging movements with respect thereto, and means for so mounting the blades including, for each of two opposite blades, a pair of apertured lugs or ears extending each substantially tangent to a portion of the peripheral wall of the said hub structure.

2. In an aircraft of the rotating wing type, a sustaining rotor including a rotative hub or axis structure, a plurality of sustaining wings or blades mounted thereon for rotation therewith and for swinging movements with respect thereto, and means for so mounting the blades including, for each of two opposite blades, a pair of apertured lugs or ears extending each substantially tangent to a portion of the peripheral wall of the said hub structure, opposed ears of said opposite blades lying substantially in a common tangential plane.

3. In an aircraft of the character described, a rotary-winged hub structure including a tubular sleeve, a pair of apertured lugs in substantial parallelism, each being thicker than the average sleeve thickness and being generally tangent to the peripheral sleeve wall, a pair of bearings fitted in said apertures, a wing mounting element fitted between said lugs, and a pivot member extending through said element and said bearings.

4. In an aircraft of the character described, a rotary-winged hub structure including a tubular sleeve, a pair of apertured lugs in substantial parallelism, each being thicker than the average sleeve thickness and being generally tangent to the peripheral sleeve wall, a pair of bearings fitted in said apertures, a wing mounting element fitted between said lugs, and a pivot member extending through said element and said bearings and being non-rotative with respect to the element but rotative with respect to the bearings.

5. In an aircraft of the character described, a rotary-winged hub structure including a tubular sleeve, a pair of apertured lugs in substantial parallelism, each being thicker than the average sleeve thickness and being generally tangent to the peripheral sleeve wall, a pair of bearings fitted in said apertures, a wing mounting element fitted between said lugs, and a pivot member extending through said element and said bearings, each of said bearings having, at the inner side of the lug, a flange to position the bearing and to prevent contact of the said element with the lugs.

6. In an aircraft of the character described, a rotary-winged hub structure including a tubular sleeve, a pair of apertured lugs in substantial parallelism, each being thicker than the average sleeve thickness and being generally tangent to the peripheral sleeve wall, a pair of bearings fitted in said apertures, a wing mounting element fitted between said lugs, and a pivot member extending through said element and said bearings, said pivot being on a horizontal axis, together with an extension on said element, laterally of said pivot, vertically apertured to receive the mid-portion of a second blade-pivot.

7. For an autorotative winged aircraft, a sustaining rotor construction comprising a pair of hollow or tubular upright axis members in telescoped but peripherally spaced apart relation, one of said members being non-rotatively mounted on the craft, and the other of said members being normally freely rotative with respect to the first, bearing means interposed between said members providing for the free rotation of the second mentioned member and for the transmission of thrusts therefrom to said first member, a plurality of elongated wings located to extend substantially radially from the axis of said members and positioned to be aerodynamically rotated thereabout under the influence of the relative air-flow in flight, said wings constituting the major means of sustaining the weight of the aircraft in flight and being subject to variable lift forces in their cycle of rotation according to the degree of forward speed of the aircraft, a generally horizontal pivot for each wing extending substantially transverse the longitudinal axis of the wing providing for substantially free swinging of the wing in a vertical plane over a range sufficient to accommodate the said variable lift forces in normal flight, whereby the centrifugal force of rotation of the wings is relied upon to hold them in their substantially radially extended positions and the weight of the machine is carried by said wings and axis members mainly in tension, and means for mounting said wing pivots on the rotative axis member including for each pivot a pair of widely spaced-apart apertured lugs in which the wing pivot is journaled, each lug being of substantially uniform thickness of body in a direction axially of the wing pivot, the lugs of each pair being in parallelism and the major body of each lug being connected to the rotative axis member in alignment with a substantial portion of the body of the rotative axis member in a plane approximately tangential thereto to form an integral plane of solid material to one side of the bearing means, whereby the centrifugal and lift forces set up by the wings in flight are carried through solid material in said plane to one side of the bearing means and distortion of the rotative axis member and thus binding of the bearing means is minimized.

8. For an autorotative winged aircraft, a sustaining rotor construction comprising a pair of hollow or tubular upright axis members in telescoped but peripherally spaced apart relation, one of said members being non-rotatively mounted on the craft, and the other of said members being normally freely rotative with respect to the first, bearing means interposed between said members providing for the free rotation of the second mentioned member and for the transmission of thrusts therefrom to said first member, a plurality of elongated wings located to extend substantially radially from the axis of said members and positioned to be aerodynamically rotated thereabout under the influence of the relative air-flow in flight, said wings constituting the major means of sustaining the weight of the aircraft in flight and being subject to variable lift forces in their cycle of rotation according to the degree of forward speed of the aircraft, a generally horizontal pivot for each wing extending substantially transverse the longitudinal axis of the wing providing for substantially free swinging of the wing in a vertical plane over a range sufficient to accommodate the said variable lift forces in normal flight, whereby the centrifugal force of rotation of the wings is relied upon to hold them in their substantially radially extended positions and the weight of the machine is carried by said wings and axis members mainly in tension, and means for mounting said wing pivots on the rotative axis member including for each pivot a pair of widely spaced-apart apertured lugs each of substantial thickness, a pair of bearings fitted in said apertures, a wing fitting or joint member positioned between the lugs of a pair, and a pivot pin extending through said fitting and said bearings and being non-rotative with respect to the fitting but rotative with respect to the said lugs, each wing being connected to its fitting or joint member by a second pivot and a fork, said fitting having a vertically apertured portion positioned between the bifurcations of the fork, the fork being rotatably mounted on the second pivot and the pivot being non-rotatively mounted in said fitting.

AGNEW E. LARSEN.